United States Patent
Van Wageningen et al.

(10) Patent No.: US 7,778,284 B2
(45) Date of Patent: Aug. 17, 2010

(54) SYNCHRONISING CELL TRANSMISSION FOR PACKET SWITCHING

(75) Inventors: Andries Van Wageningen, Wijlre (NL); Hans-Jurgen Reumerman, Aachen (DE); Armand Lelkens, Heerlen (NL); Joern Ungermann, Aachen (DE)

(73) Assignee: ST-Ericsson SA, Plan-les-Ouates (CH)

( * ) Notice: Subject to any disclaimer, the term of this patent is extended or adjusted under 35 U.S.C. 154(b) by 1401 days.

(21) Appl. No.: 10/510,299

(22) PCT Filed: Apr. 7, 2003

(86) PCT No.: PCT/IB03/01401
§ 371 (c)(1),
(2), (4) Date: Apr. 26, 2005

(87) PCT Pub. No.: WO03/085906
PCT Pub. Date: Oct. 16, 2003

(65) Prior Publication Data
US 2005/0175000 A1    Aug. 11, 2005

(30) Foreign Application Priority Data
Apr. 11, 2002    (EP) .................................. 02008070

(51) Int. Cl.
*H04J 3/06* (2006.01)
(52) U.S. Cl. ..................... 370/508; 370/516

(58) Field of Classification Search ............... None
See application file for complete search history.

(56) References Cited

U.S. PATENT DOCUMENTS

| | | | |
|---|---|---|---|
| 5,265,088 A * | 11/1993 | Takigawa et al. | 370/249 |
| 6,208,667 B1 | 3/2001 | Caldara et al. | |
| 6,215,412 B1 | 4/2001 | Franaszek et al. | |
| 6,275,468 B1 | 8/2001 | Burke et al. | |
| 6,792,003 B1 * | 9/2004 | Potluri et al. | 370/476 |
| 7,260,092 B2 * | 8/2007 | Dally | 370/369 |
| 2001/0033572 A1 * | 10/2001 | Caldara | 370/395 |

FOREIGN PATENT DOCUMENTS

| | | |
|---|---|---|
| EP | 0 978 968 B1 | 2/2005 |
| JP | 7-79218 | 3/1995 |

* cited by examiner

*Primary Examiner*—Daniel J. Ryman
*Assistant Examiner*—Tito Pham
(74) *Attorney, Agent, or Firm*—Timothy L. Boller; Seed IP Law Group PLLC

(57) ABSTRACT

The invention relates to a method and a packet switch for synchronising port controllers (1) with cross-connection means (40). By switching cross-connection means from loop-back configurations (41a, 43a) to no-transmission configurations, consecutively an offset counter (32) in a port controller (1) may be altered until transmission of cells is synchronised, so as cells are switched within said cross-connection means (40) within transmission periods.

31 Claims, 3 Drawing Sheets

SYNCHRONISING CELL TRANSMISSION FOR PACKET SWITCHING

The invention relates to a method for synchronising start of cell times in input/output means with cell transmission periods in at least one cross-connection means for packet switching, where cells are transferred between said input/output means by said cross-connection means in cell transfer periods, where configurations of said cross-connection means are changed between cell transfer periods in cross-connection configuration periods, where cells from said input/output means are sent at start of cell times, and where said sent cells are received in said cross-connection means. The invention further relates to a packet switch comprising input/output means, with a port controller, with a cell input port, and a cell output port, cross-connection means comprising cell input ports and cell output ports connected to said cell output port and cell input port of said port controllers, respectively. Furthermore, the invention relates to the use of such a method and such a packet switch.

Switching-nodes of packet switched networks comprise packet-switches. These packet-switches transfer data packets between input and output ports, based on address information comprised in each incoming packet. Incoming packets are buffered in line cards and organised in input port queues. These input port queues are organised as virtual output queues (VOQ), which are implemented inside a port controller, located on a line card. These port controllers are connected to switch cards, comprising crossbar matrices and an arbiter, respectively, by cables. The arbiter calculates input/output configurations of the matrices to allow an even transmission of incoming packets of all connected port controllers. To switch the incoming packets to the respective output ports, the crossbar matrices connect input ports with the respective output ports during cell transfer periods. To change the connections between input and output ports, the configuration of the matrices have to be changed by the arbiter during switch-over times.

Incoming packets are segmented within the line cards into fixed size packet fragments, also called cells. Outgoing packets are reassembled from cells which have been switched from a crossbar matrix to the respective line card.

To allow a smooth transmission of incoming packets, the arbiter works in close co-operation with the port controllers on the line cards. Each port controller sends a regular update of its VOQ state to the arbiter. The arbiter keeps a copy of the actual state-information of the VOQs of all connected port controllers. Based on the VOQ state-information received from the connected port controllers, the arbiter calculates the I/O configuration of the matrices and sends the result to the matrices, respectively, and the port controllers at regular intervals.

Figure 1:
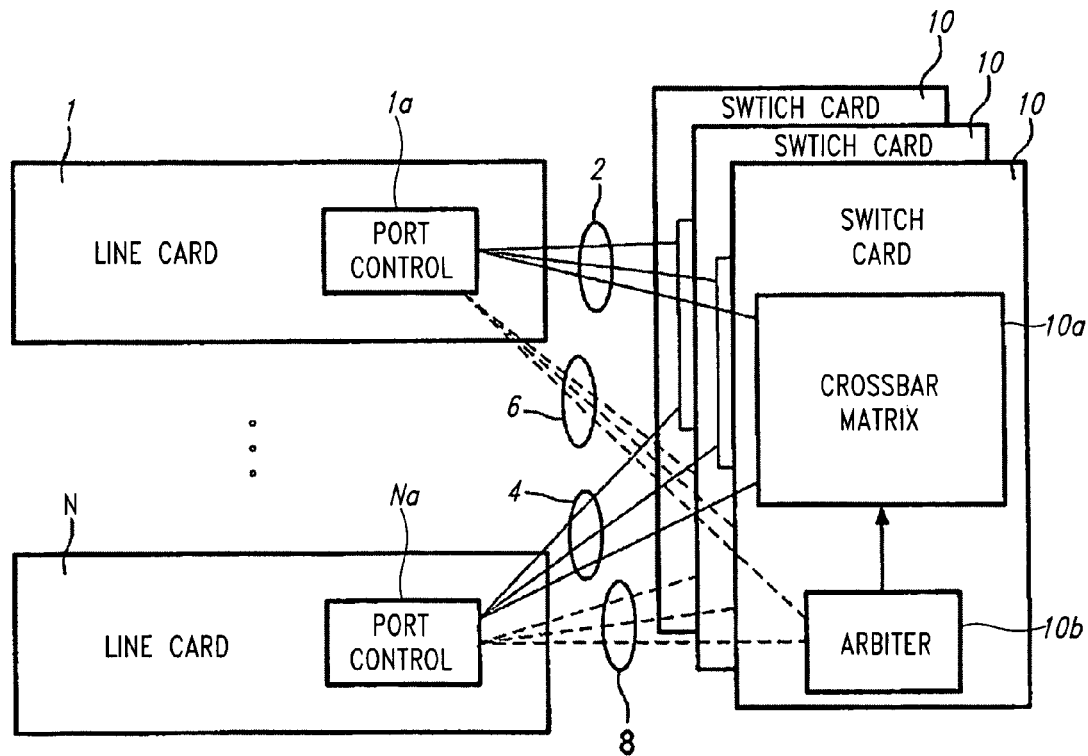

In FIG. 1, a known system is depicted. A plurality of line cards 1-N is connected to a number of switch cards 10. The line cards 1-N communicate with the switch cards 10 by using port controllers 1a-Na. The port controllers 1a-Na send data cells to and receive data cells from the switch cards 10 via connection lines 2, 4. The state information of the output queues of the port controllers 1a-Na are communicated to arbiters 10b via communication lines 6, 8. The arbiters 10b decide which line cards 1-N are connected with each other via the lines 4, 2 to transmit respective cells in the output queues of the port controllers 1a-Na.

The transmission of cells between port controllers 1a-Na is switched by setting a crossbar matrix 10a appropriately. Input ports of the switch cards 10 are represented by lines in the crossbar matrix 10a. Output port of the switch cards 10a represented by columns in the crossbar matrix 10a. To connect, for example, input port "1" with output port "3", a switch located at line 1 at column 3 of a matrix 10a is set "on".

In case the crossbar matrix 10a, or the switch 10 does not comprise a buffer memory, instant switching has to be provided, otherwise incoming packets would be corrupted when switching between a first configuration to a second configuration of crossbar matrix 10a is carried out during transmission of said cell.

A crucial function for a buffered matrix to work properly is the alignment of incoming cells. Only if incoming cells are aligned, configurations of the matrix can be changed without disturbing cell transfers. An exact alignment is best for synchronisation. Synchronisation of the cells at the input of the crossbar matrix is complicated, because the cables connecting port controller 1a-Na with crossbar matrix 10a may be of different lengths. Different lengths cause different signal time delay on the lines. With data rates of several Gbit/s, a difference of some centimeters of the line length results in a misalignment of the cells for a couple of bit clocks.

From JP 7-79218 it is known to provide a synchronisation pattern detection circuit. The synchronisation pattern detection circuit detects frames and synchronisation patterns from information stored in a shift register. By transmitting a sync signal, a fixed difference of transmission times is calculated and a synchronisation pattern is evaluated. By applying the synchronisation pattern, wire length can be different, as the input is synchronised by using the synchronisation pattern. A problem of generating synchronising patterns is that each line card must generate such a synchronisation pattern and each switch card must derive the synchronisation pattern from the line card.

Thus, it is an object of the invention to provide a method and a system that allows independent alignment of cells by the line cards. A further object of the invention is to provide a flexible system configuration, being able to allow synchronisation in different configurations. A further object of the invention is to provide packet switching without buffer memory in the crossbar matrices.

The objects of the invention are solved by oscillating said configuration during a set-up period between a loopback configuration and a no-transmission configuration, whereby received cells are transferred back to said sending input/output means in said loopback configuration and received cells are not transferred back to said sending input/output means in said no-transmission configuration, receiving back transferred cells in said input/output means, checking said received cells in said input/output means for a transmission error, and shifting an offset of said start of cell times in case a transmission error occurred, until transferring back at least one cell is wholly carried out within a cell transfer period.

The configuration of the cross-connection means is changed between loopback configuration and no-transmission configuration. In loopback configuration, incoming cells are transferred back to the sending input/output means, for instance a port controller. In no-transmission configuration, incoming cells are not sent back to the sending input/output means.

In case cells are transferred back, these cells are received in said input/output means. As the configuration of the cross-connection means is switched between loopback configuration and no-transmission configuration, transmitted cells may be corrupted. Corruption of cells may appear, if they are received in the cross-connection means during times of configuration, e.g. cross-connection configuration periods, also called switch-over periods. Corruption may also occur, if parts of the cells are received during transmission periods and parts of the cells are received during no-transmission periods. Only in case the cell is received and re-transmitted wholly within a transmission, or loopback period, it is received without transmission error.

By shifting the offset of start of cell times, the input/output means tries to find the correct time, at which cells may be transmitted and further processed within the cross-connection means without falling into a switch-over period or a no-transmission period. The offset is shifted until at least one cell is wholly re-transferred within a cell transfer period. In that case an input/output means has determined the times at which it may send cells, so that they are not corrupted due to matrix configurations.

Port controllers and separate line cards, being connected to the crossbar matrix by cables of different lengths may be aligned so that their cells are received within the matrix at equal times. The loopback configuration is active for one cell transfer period and the no-transmission configuration is also active during one cell transmission period. In no-transmission configuration, ongoing cell transfers are disturbed. Only if the offset is such that the whole cell is transmitted within loopback configuration, the input/output means are synchronised with the cross-connection means.

An alignment of all incoming cells from connected input/output means is made available according to an embodiment. In this case the transmission data rate may be at its maximum, as transmission periods only last for exactly one transmission of a cell.

A central clock signal, according to an embodiment, allows easy cell synchronisation.

Serialisation and de-serialisation, according to at least one embodiment, allows serialised transmission of data packets. Evaluating a bit error indicator, according to an embodiment, may also be carried out based on a coding scheme applied for transmission on a transmission line. The output of the bit error indication may be used as decision to change the offset of start of cell times in order to delay the output of cells.

Using an offset counter, according to an embodiment, allows a shift of the start of cell times of outgoing cells with respect to a matrix configuration synchronisation signal. The delay is incremented or decremented by defined step widths.

The offset counter may also be controlled, according to an embodiment, in a way that the start of cell time is pre-running with respect to the start of cell signal as much as possible without generation of bit errors, and afterwards delaying the start of cell time as much as possible until bit errors occur. The length of cell transmission periods may then be adjusted and the total throughput is increased. The bit error rate is brought to a minimum in case the start of cell time is set according to an embodiment.

According to a further aspect of the invention, a packet switch is provided, where said port controller comprises a start of cell signal generator for generating start of cell signals, an offset controller for shifting a start of cell time based on said start of cell signal, and an error detection mean for detecting corrupt received cells and where said cross-connection means comprises a configuration controller for controlling an oscillation between a loopback configuration and a no-transmission configuration of said cross-connection means.

A packet switch, according to an embodiment, is advantageous, as a central clock signal allows exact synchronisation between port controllers and cross-connection means.

By providing serialisation and de-serialisation means, according to an embodiment, data bits or packets may be serially transferred.

Providing an N×N cross matrix, according to at least one embodiment, configuration changes may be applied easily. In such a matrix, a line corresponds to an input port and a column corresponds to an output port. A switch at position (X, Y) in said N×N matrix connects input port X with output port Y.

By providing a bit error indicator, according to an embodiment, a bit error may be derived from the coding scheme applied for a transmission on a line.

Another aspect of the invention is the use of a described method or a described packet switch in packet switched networks for synchronising start of cell times in various port controllers during a set-up, to allow configuration changes in cross-connection means without disturbing cell transfers.

These and other aspects of the invention will be apparent from and elucidated with reference to the embodiments described hereinafter.

Figure 2:
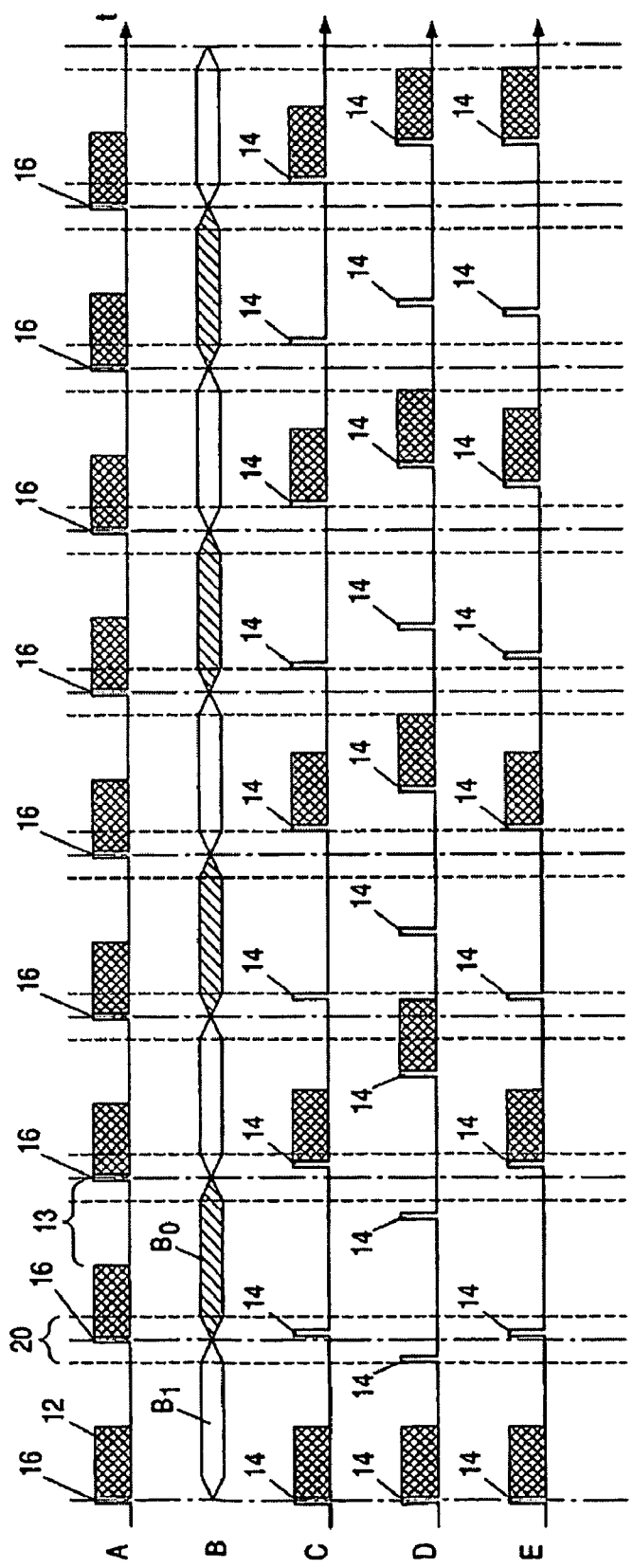
Figure 3:
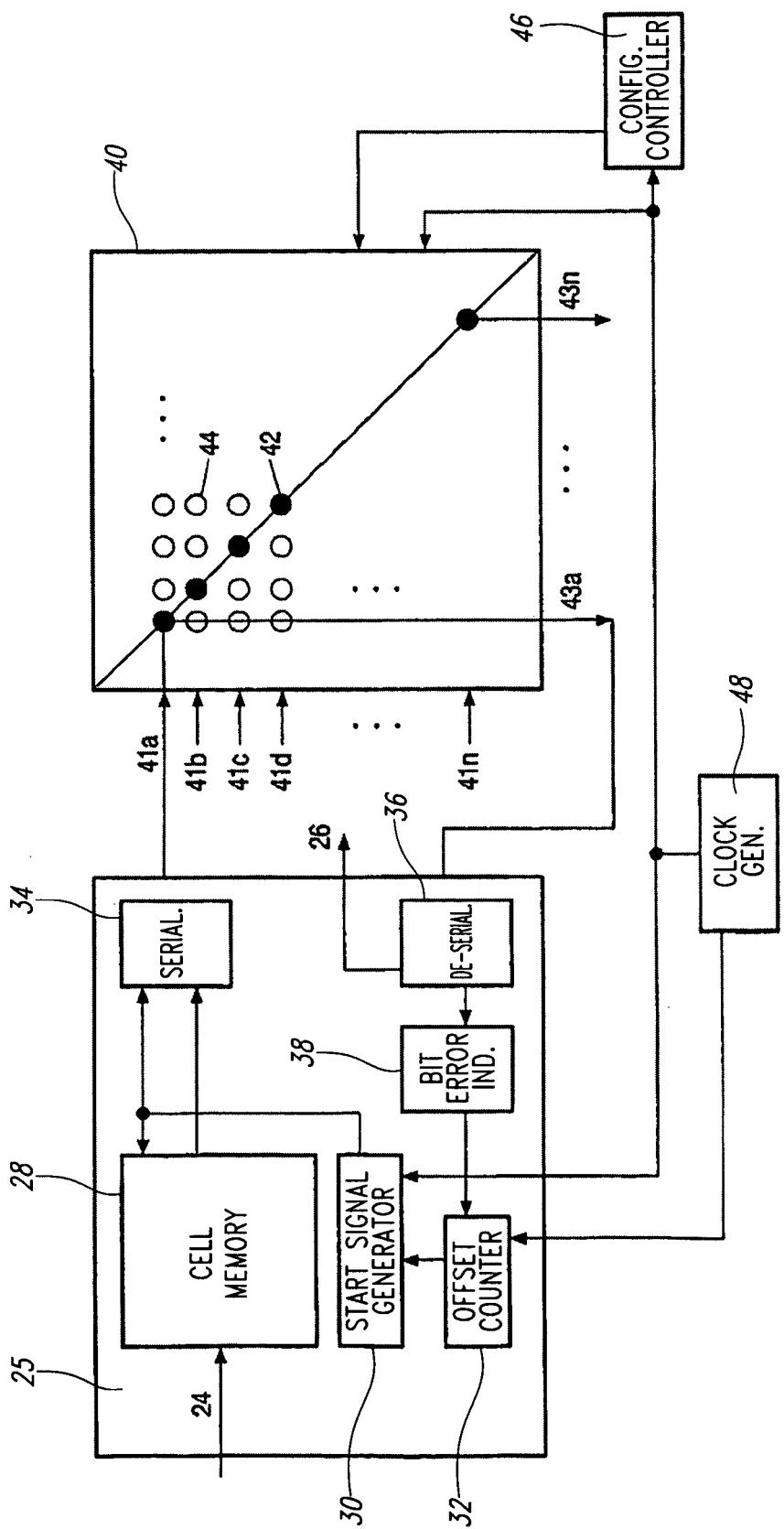

In the figures show:

FIG. 1 a packet switch configuration;

FIG. 2 diagrammatically the variation of the offset of start of cell times;

FIG. 3 a block diagram of an inventive packet switch.

FIG. 2 depicts in diagrams A-E a succession of cells being send within a set-up period of a packet switch.

As can be seen in diagram A, data cells 12 are usually sent at start of cell times 14, which usually correspond to a start of cell signal 16. Usually, a data cell 12 is sent exactly after a start of cell signal 16 is generated. In that case, all cells from all port controllers are sent at the same time. As cables connecting the port controllers with the crossbar matrices may have different length, the cells are received in the matrices at different times. For switching packet switched connections, the configuration of the matrices have to be changed. During these configuration periods 20, cells 12 may be received within the matrices, which causes cell corruption. The invention provides a method to set up a packet switch in a way, that cell corruption may be avoided.

The configuration of a crossbar matrix of a switch card is changed, as depicted in diagram B, between configuration $B_1$ and configuration $B_0$ during a set-up period. Configuration $B_1$ stands for loopback configuration, where the matrix is a unit matrix, and configuration $B_0$ stands for no-transmission configuration, where the matrix is a null matrix.

During a set-up period of the crossbar matrix, the configuration is changed between $B_1$, and $B_0$. In configuration $B_1$, cells 12 sent from a port controller 25 are sent back to this respective port controller 25. During no-transmission time $B_0$, cells 12 sent from port controller 25 are not sent back to port controller 25. The inventive method works as follows.

As depicted in diagram C, start of cell signals 16 are generated in all port controllers according to a common clock signal at system start. Cells 12 are sent at start of cell times 14 and received in the crossbar matrix during loopback configuration $B_1$, no-transmission configuration $B_0$, and set-up period 20.

First, cells are released from the cell memory at start of cell times 14 directly after reception of the start of cell signal 16. An offset may be generated, by which the start of cell time 14 is shifted from the start of cell signal 16 by a certain value. In case sent cells 12 are received in the matrix during set-up period 20 or no-transmission configuration $B_0$, they are not correctly sent back to the sending port controller. The received cells are corrupt. To recognise corrupt cells, each received cell is evaluated and thus transmission errors are detected. In case a transmission error is detected, the cell 12 has been received in the matrix at times where the transmission becomes corrupt, e.g. no-transmission period $B_0$ or set-up period 20.

The offset is increased incrementally, the start of cell time 14 is incrementally delayed from the start of cell signal 16, until the cell 12 will be sent at a time where it can be received in the matrix within the loopback configuration time $B_0$ and thus sent back to the port controller without error. The offset will then not be increased further, and may be used during the operation of port controller, as it allows an error-free transmission of cells.

In diagram D, the offset of the start of cell time 14 is decreased. First, a cell is sent at times at which it is received in the matrix during set up period 20. In that case a cell 12 is corrupted. By shifting the offset, the start of cell time 14 is pre-running the start of cell signal to a further extend. After a few shifts, the start of cell time 14 will be such, that a cell 12 will be wholly received within said crossbar matrix during period $B_1$.

According to diagram E, the offset is controlled in a way that the start of cell time 14 is at first pre-running with respect to the start of cell signal 16 as much as possible without generating bit errors, and afterwards decreased as much as possible until bit errors start appearing. By this, the duration of a loopback configuration $B_1$ is evaluated and the start of cell time 14 can be adjusted such that a cell 12 will be transmitted in the middle of transmission time. Also the gap 13 between cells 12 may thus be decreased to a minimum value.

FIG. 3 depicts a port controller 25 and a crossbar matrix 40. Port controller 25 provides an input port 24, an output port 26, a cell memory 28, a start of cell signal generator 30, an offset counter 32, a serialiser 34, a de-serialiser 36 and a bit error indicator 38. Crossbar matrix 40 provides cell input ports 41a-41n, cell output port 43a-43n, switched connections 42 and interrupted connected 44. Further depicted is a central clock generator 48 and a configuration controller 46.

Incoming packets at port 24 are segmented into fixed sizes packet fragments, cells, and stored in cell memory 28. Outgoing cells are reassembled back into packets and put out at port 26. During set-up of a port controller 25, cells are sent at start of cell times which are generated at the start of cell time generator. These packets are serialised in serialiser 34 and sent to cell input port 41a. In loopback configuration, cell input port 41a is switched to cell output port 43a.

Loopback configuration means that a unit matrix of the switches 42, 44 is generated, whereby an input port 41a, b is switched to an output port 43a, b, respectively. The unit matrix means that each input port is switched to its respective output port and no other connection is switched. These ports being switched belong to one same port controller. The switches 42 are "on" the switches 44 are "off". This is the so-called loopback configuration.

No-transmission configuration is realised by a null matrix, where no connections between input ports and output ports are switched at all. All incoming data-packets are lost or corrupted. All switches 42, 44 are "off".

During set-up the crossbar matrix 40 is switched between unit matrix and null matrix by configuration controller 46, which is controlled by a system clock signal generated by central clock generator 48. The system clock generated by central clock generator 48 is also provided to offset counter 32 and to start of cell signal generator 30. Cells which are retransmitted to port controller 25 are received in the serialiser 36. The received cells are evaluated in bit error rate indicator 38. In case a bit error occurred, the offset counter 32 is increased. By increasing the offset counter 32 the start of cell signal generator generates a start of cell time prevailing the central clock signal by the amount of the offset counter 32. By increasing the offset counter 32, the start of cell time will be changed until a cell is transmitted to crossbar matrix 40 and received by de-serialiser 36 without transmission errors, which means that the cell is received in crossbar matrix 40 in a transmission period.

By applying the offset counter and the bit error indicator 38, start of cell times may be synchronised so as to align incoming cells at matrix 40 from various port controllers 25.

No central synchronisation mechanism or line length measurement is needed, rather all port controllers adjust the cell alignment autonomously.

REFERENCE SIGNS

1, N line card
1a, Na port controller
2, 4 transmission connection
6, 8 signalling connection
10 switch card
10a crossbar matrix
10b arbiter
12 cell
13 transmission gap
14 start of cell time
16 start of cell signal
$B_1$ loopback configuration
$B_0$ no-transmission configuration
20 set-up period
24 input
26 output
28 cell memory
30 start of cell signal generator
32 offset counter
34 serialiser
36 de-serialiser
38 bit error indicator
40 crossbar matrix
41 cell input port
42 switched connection
43 cell output port
44 interrupted connection
46 configuration controller
48 central clock generator

The invention claimed is:

1. A method, comprising:

synchronising start of cell times in input/output circuits with cell transmission periods in a cross-connection circuit;

transferring cells between said input/output circuits by said cross-connection circuit in cell transfer periods;

changing configurations of said cross-connection circuit between cell transfer periods in cross-connection configuration periods;

sending cells from a sending input/output circuit of said input/output circuits at start of cell times;

receiving said sent cells in said cross-connection circuit;

oscillating between a loopback configuration and a no-transmission configuration;

transferring the received cells back to said sending input/output circuit in said loopback configuration and not transferring the received cells back to said sending input/output circuit in said no-transmission configuration;

receiving back transferred cells in said sending input/output circuit during said loopback configuration;

checking said cells transferred back during said loopback configuration in said sending input/output circuit for a transmission error; and shifting an offset of said start cell times in case a transmission error occurred, until transferring back at least one cell is wholly carried out within a cell transfer period.

2. A method according to claim 1, wherein the shifting includes shifting said offset of start of cell times in said sending input/output circuit, respectively, to align the time sent cells from said sending input/output circuit are received in said cross-connection circuit.

3. A method according to claim 1, including controlling said start of cell times, said offset of start of cell times and said cross-connection configuration times by a central clock signal.

4. A method according to claim 3, wherein the shifting includes shifting said offset of start of cell times using an offset counter and changing said offset counter by an amount of clock cycles of said central clock signal.

5. A method according to claim 1, including calculating start of cell times based on a start of cell signal and said offset of said start of cell times, serializing said cells, and sending said serialized cells together with said start of cell signal at said start of cell times.

6. A method according to claim 1, including receiving transferred back cells, de-serializing said cells and checking each cell for transmission errors.

7. A method according to claim 1, including receiving transferred back cells, de-serializing said cells and evaluating a bit error indicator.

8. A method according to claim 1, wherein the shifting includes shifting said offset of said start of cell times to a maximum without generating transmission errors, and shifting said offset of said start of cell times to a minimum without generating transmission errors.

9. A method according to claim 8, wherein the shifting includes setting said offset of said start of cell times in between said maximum and said minimum.

10. A packet switch comprising:
a plurality of port controllers each with a cell input port and a cell output port, the cell output ports configured to output cells at respective start of cell times; and
a cross-connection switch including cell input ports and cell output ports connected to said cell output ports and cell input ports of said port controllers, respectively,
wherein a sending port controller of said port controllers comprises:
an error detector configured to detect corrupt received cells; and
an offset controller configured to shift the start of cell times for the respective output port in response to the detection of corrupt received cells by the error detector; and
wherein said cross-connection switch comprises:
a configuration controller configured to control an oscillation of the cross-connection switch between a loopback configuration in which cells received by the cross-connection switch are transferred back to a respective sending port controller, and a no-transmission configuration of said cross-connection switch.

11. A packet switch according to claim 10, further comprising a central clock generator for providing a central clock signal, wherein each sending port controller comprises a start of cell signal generator, and said start of signal generator, said offset controller, and said configuration controller each comprise an input port for said central clock signal.

12. A packet switch according to claim 10, wherein said sending port controller comprises a serializer and a de-serialize for serializing cells to be sent and de-serializing received cells.

13. A packet switch according to claim 10, wherein said cross-connection switch comprises an N×N crossbar matrix, selectively connecting N cell input ports with N cell output ports.

14. A packet switch according to claim 13, wherein said loopback configuration is realized by a unit matrix and a no-transmission configuration is realized by a null matrix.

15. A packet switch according to claim 10, wherein said error detector is a bit error indicator.

16. The packet switch of claim 10 wherein the offset controller is configured to select an offset to shift the start of cell times for the respective sending port controller so that the start of cell times for the respective sending port controller is in a middle of a transmission time range, the transmission time range determined based on the detection of corrupt received cells by the error detector.

17. A method, comprising:
synchronizing start of cell times, in a packet switched network, for plural port controllers during a set up to allow configuration changes in a cross-connection circuit without disturbing cell transfers;
transferring cells between said port controllers by said cross-connection circuit in cell transfer periods;
changing configurations of said cross-connection circuit between cell transfer periods in cross-connection configuration periods;
sending cells from a sending port controller of said port controllers at start of cell times;
receiving said sent cells in said cross-connection circuit;
oscillating between a loopback configuration and a no-transmission configuration;
transferring the received cells back to said sending port controller in said loopback configuration and not transferring the received cells back to said sending port controller in said no-transmission configuration;
receiving back transferred cells in said sending port controller during said loopback configuration;
checking said cells transferred back in said sending port controller for a transmission error; and
shifting an offset of said start cell times in case a transmission error occurred, until transferring back at least one cell is wholly carried out within a cell transfer period.

18. A method according to claim 17, wherein the shifting includes shifting said offset of start of cell times in said sending port controller, respectively, to align the time sent cells from said sending input/output circuit are received in said cross-connection circuit.

19. A method according to claim 17, including controlling said start of cell times, said offset of start of cell times and said cross-connection configuration times by a central clock signal.

20. A method, comprising:
synchronising start of cell times in a plurality of port controllers during a set up to allow configuration changes in a cross-connection circuit without disturbing cell transfers, the port controllers each having a cell input port and a cell output port, the respective cell output ports of the respective port controllers configured to transmit cells at respective start of cell times, and the cross-connection circuit including cell input ports and cell output ports connected to said cell output ports and cell input ports of said port controllers, respectively,
wherein a respective sending port controller of said port controllers performs:
generating start of cell signals using a start of cell signal generator, shifting a start of cell time for the respective port controller based on said start of cell signal using an offset controller, and detecting corrupt received cells using an error detector, and wherein said cross-connection circuit controls an oscillation between a loopback configuration in which data received from a respective sending port controller by the cross connection is transmitted back to the respective sending port controller, and a no-transmission configuration of said cross-connection circuit, using a configuration controller, and the shifting of the start of cell times for the respective port controllers is based on the detecting of corrupt cells transferred back to the respective port controllers.

21. A method according to claim 20, further comprising providing a central clock signal using a central clock generator, wherein said start of cell signal generator, said offset controller, and said configuration controller each comprise an input port for said central clock signal.

22. A system, comprising:
a plurality of port controllers each having a cell input port configured to receive cells and a cell output port configured to transmit cells at start of cell times; and a cross-connection matrix coupled to the cell input ports and the cell output ports of the plurality of port controllers, the cross-connection matrix having a configuration controller configured to control an oscillation of the cross-connection matrix between a loopback configuration, in which data received by the cross-connection matrix is transferred back to a respective cell input port of the respective sending port controller, and a no transmission configuration, wherein a sending port controller of the plurality of port controllers comprises:

an error detector configured to detect corrupt cells transferred back to the sending port controller by the cross-connection matrix during the loopback configuration; and an offset controller configured to shift a start of cell time for the sending port controller based on the detection of corrupt cells transferred back to the sending port controller by the cross-connection matrix during the loopback configuration.

23. The system of claim 22, further comprising a central clock generator wherein the sending port controller comprises a start of cell signal generator and the start of cell signal generator, the offset controller, and the configuration controller are coupled to the central clock generator.

24. The system of claim 22 wherein the sending port controller comprises a serializer configured to serialize cells to be sent and a de-serializer configured to de-serialize received cells.

25. The system of claim 22 wherein the cross-connection matrix comprises a N×N crossbar matrix configured to selectively connect N cell input ports with N cell output ports.

26. The system of claim 22 wherein the matrix is configured as a unit matrix in the loopback configuration and is configured as a null matrix in the no-transmission configuration.

27. The system of claim 22 wherein the error detector comprises a bit error indicator.

28. The system of claim 22, wherein the offset controller is configured to select an offset to shift the start of cell time for the sending port controller so that the start of cell time is in a middle of a transmission time range, the transmission time range determined based on the detection of corrupt transferred back cells by the error detector.

29. A method, comprising:
oscillating, during a set up period, a cross-connection switch coupled to a plurality of port controllers between a loop back configuration, in which data received by the cross-connection switch from a respective port controller in the plurality of port controllers is transferred back to the respective port controller, and a no-transmission configuration, in which data received by the cross-connection switch from the respective port controller is not transferred back to the respective port controller; and determining, during the set up period, respective cell transmission time offsets for the plurality of port controllers by:

sending a cell from the respective port controller in the plurality of port controllers to the cross-connection switch at a transmission time based on a clock signal and a delay for the respective port controller;

checking data transferred back to the respective port controller by the cross-connection switch for receipt of a corrupt cell;

when receipt of a corrupt cell is detected, increasing the delay for the respective port controller;

repeating the sending, the checking and the increasing the delay for the respective port controller at least until receipt of a non-corrupt cell by the respective port controller is detected; and setting the cell transmission time offset for the respective port controller based on the delay for the respective port controller.

30. The method of claim 29, further comprising generating a central clock signal and providing the central clock signal to the plurality of port controllers and the cross-connection switch.

31. The method of claim 30 wherein:
after receipt of a first non-corrupt cell by the respective port controller is detected, the sending, the checking and the increasing the delay are repeated until receipt of a subsequent corrupt cell by the respective port controller is detected; and setting the cell transmission offset for the respective port controller comprises setting the transmission offset based on a value of the delay for the respective port controller when the first non-corrupt cell was received by the respective port controller and a value of the delay for the respective port controller when the subsequent corrupt cell was received by the respective port controller.

* * * * *